US009953564B2

United States Patent
Kondo

(10) Patent No.: US 9,953,564 B2
(45) Date of Patent: Apr. 24, 2018

(54) IMAGE DISPLAY CONTROL APPARATUS, IMAGE DISPLAY SYSTEM, IMAGE DISPLAY CONTROL METHOD AND PROGRAM

(71) Applicant: SONY CORPORATION, Tokyo (JP)

(72) Inventor: Tatsumasa Kondo, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 97 days.

(21) Appl. No.: 14/786,294

(22) PCT Filed: Apr. 10, 2014

(86) PCT No.: PCT/JP2014/002072
§ 371 (c)(1),
(2) Date: Oct. 22, 2015

(87) PCT Pub. No.: WO2014/203438
PCT Pub. Date: Dec. 24, 2014

(65) Prior Publication Data
US 2016/0063917 A1 Mar. 3, 2016

(30) Foreign Application Priority Data
Jun. 17, 2013 (JP) ................................. 2013-126982

(51) Int. Cl.
*G09G 3/3208* (2016.01)
*G06F 3/14* (2006.01)
*G09G 5/14* (2006.01)

(52) U.S. Cl.
CPC ......... *G09G 3/3208* (2013.01); *G06F 3/1423* (2013.01); *G09G 5/14* (2013.01);
(Continued)

(58) Field of Classification Search
CPC .. G09G 3/3208; G09G 3/3614; G09G 3/3648; G06F 3/1423
(Continued)

(56) References Cited

U.S. PATENT DOCUMENTS 4,052,126 A * 10/1977 Freudenschuss ...... G03B 19/18
352/141
6,235,455 B1 * 5/2001 Ito ........................ G03C 7/3041
430/362
(Continued)

FOREIGN PATENT DOCUMENTS

CN 1606768 A 4/2005
CN 1912975 A 2/2007
(Continued)

OTHER PUBLICATIONS

Extended European Search Report dated Jan. 18, 2017 in Patent Application No. 14813345.7.
(Continued)

*Primary Examiner* — Fred Tzeng
(74) *Attorney, Agent, or Firm* — Oblon, McClelland, Maier & Neustadt, L.L.P.

(57) ABSTRACT

[Object] To provide a technology that can mitigate accurately the ghosting problem.
[Solving Means] An image display control apparatus according to the present technology includes a control unit. The control unit switches a first mode for reducing a brightness of an image without inverting the brightness of the image fixedly displayed on a specific area of a screen to a second mode for inverting the brightness of the image and reducing the brightness of the image inverted, and controls a display such that the image is displayed on the area of the screen depending on the mode switched.

20 Claims, 13 Drawing Sheets

(52) U.S. Cl.
CPC ............. *G09G 2320/0233* (2013.01); *G09G 2320/0257* (2013.01); *G09G 2320/046* (2013.01); *G09G 2320/0606* (2013.01); *G09G 2320/0613* (2013.01); *G09G 2320/0626* (2013.01); *G09G 2320/0686* (2013.01); *G09G 2330/025* (2013.01); *G09G 2330/026* (2013.01); *G09G 2380/08* (2013.01)

(58) Field of Classification Search
USPC ........................................................ 345/213
See application file for complete search history.

(56) References Cited

U.S. PATENT DOCUMENTS

| | | | | |
|---|---|---|---|---|
| 6,536,907 | B1* | 3/2003 | Towner | H04N 5/335 348/745 |
| 7,400,314 | B1 | 7/2008 | Agano | |
| 9,652,589 | B2* | 5/2017 | Caspi | G06F 19/32 |
| 2003/0098824 | A1* | 5/2003 | Kang | G09G 3/294 345/63 |
| 2005/0083324 | A1 | 4/2005 | Ueda et al. | |
| 2005/0184952 | A1* | 8/2005 | Konno | G09G 3/3426 345/102 |
| 2007/0109284 | A1 | 5/2007 | Yamazaki et al. | |
| 2008/0055519 | A1* | 3/2008 | Battersby | G09G 3/3648 349/68 |
| 2008/0068443 | A1* | 3/2008 | Thielman | H04N 7/147 348/14.1 |
| 2009/0046089 | A1 | 2/2009 | Zhuang et al. | |
| 2009/0195487 | A1* | 8/2009 | Shimoshikiryoh | G09G 3/3614 345/89 |
| 2011/0310352 | A1* | 12/2011 | Nakano | G03B 21/208 353/20 |
| 2012/0081386 | A1* | 4/2012 | Wiemker | G06T 7/0012 345/589 |
| 2014/0005550 | A1* | 1/2014 | Lu | A61B 8/465 600/459 |
| 2017/0090724 | A1* | 3/2017 | Young | G06F 3/03543 |

FOREIGN PATENT DOCUMENTS

| | | |
|---|---|---|
| JP | 6-102845 A | 4/1994 |
| JP | 2000-214838 A | 8/2000 |
| JP | 2000-221908 A | 8/2000 |
| JP | 2003-186434 A | 7/2003 |
| JP | 2005-283908 A | 10/2005 |
| JP | 2012-123414 A | 6/2012 |
| WO | WO 99/53472 A1 | 10/1999 |

OTHER PUBLICATIONS

International Search Report dated Jul. 8, 2014 in PCT/JP2014/002072 (with English language translation).
Combined Chinese Office Action and Search Report dated Apr. 10, 2017 in Patent Application No. 201480033009.0 (with English Translation).
Office Action dated Feb. 27, 2018 in Japanese Patent Application No. 2015-522484.

* cited by examiner

IMAGE DISPLAY CONTROL APPARATUS, IMAGE DISPLAY SYSTEM, IMAGE DISPLAY CONTROL METHOD AND PROGRAM

TECHNICAL FIELD

The present technology relates to a technology such as an image display control apparatus for adjusting brightness of images displayed fixedly on a display.

BACKGROUND ART

In the related art, displays for displaying images such as a liquid crystal display and an organic EL (EL: Electro-Luminescence) display are widely known.

The organic EL display is configured of self-emitting type light emitting devices arranged in a matrix. The organic EL display has a feature that it can be thinner than the liquid crystal display requiring a back light, and a feature that can realize a high contrast.

As the organic EL display can realize a high contrast, a dark image can be correctly expressed. For this reason, the organic EL display may be used as a display for displaying, for example, an X ray image, a CT (CT: Computed Tomography) image, an MRI (MRI: Magnetic Resonance Imaging) image, or the like. In other words, the organic EL display may be used as a display for diagnostic imaging.

Each light emitting device configuring the organic EL display has a feature that it is deteriorated over time accompanied by emitting light. Therefore, when the same image is displayed on the screen for a long time, the light emitting device emitting light at a relatively high brightness is undesirably deteriorated faster than the light emitting device emitting light at a relatively low brightness. This may generate a variation in a deterioration speed in each light emitting device. When it tries to display on the screen at the same brightness, it is undesirably incapable of displaying at the same brightness. Specifically, when it tries to display on the screen at the same brightness, depending on the variation of the deterioration, characters and symbols may be undesirably viewed as floating. This phenomenon is typically called as "ghosting".

As the technology relating to the problem, the following Patent Document 1 is disclosed.

Patent Document 1: Japanese Patent Application Laid-open No. 2002-221908

SUMMARY OF INVENTION

Problem to be Solved by the Invention

Since the ghosting deteriorates user's visibility, a technology that can mitigate the ghosting problem accurately is desirable.

In view of the above-described circumstance, an object of the present technology is to provide a technology that can mitigate accurately the ghosting problem.

Means for Solving the Problem

An image display control apparatus according to the present technology includes a control unit.

The control unit switches a first mode for reducing a brightness of an image without inverting the brightness of the image fixedly displayed on a specific area of a screen to a second mode for inverting the brightness of the image and reducing the brightness of the image inverted, and controls a display such that the image is displayed on the area of the screen depending on the mode switched.

According to the present technology, the brightness of the image fixedly displayed on the specific area of the screen is inverted. In this manner, the part that is represented at a relatively high brightness and the part that is represented at a relatively low brightness are inverted in the first mode and the second mode. Accordingly, as the deterioration speed of the light emitting device within the area where the image is fixedly displayed can be uniform, the problems of the ghosting and the color unevenness can be mitigated.

Furthermore, according to the present technology, in both modes of the first mode and the second mode, the brightness of the image fixedly displayed on the specific area of the screen is reduced. In this manner, a difference between the deterioration speeds of the part that is represented at a relatively high brightness and the part that is represented at a relatively low brightness can be small. Accordingly, the problems of the ghosting and the color unevenness can be mitigated with higher accuracy.

In the image display control apparatus, the control unit measures a first deterioration degree for a first part within an area that is represented at a relatively high brightness in the first mode and is represented at a relatively low brightness in the second mode, and a second deterioration degree for a second part within an area that is represented at a relatively low brightness in the first mode and is represented at a relatively high brightness in the second mode, and switches the first mode to the second mode base on the first deterioration degree and the second deterioration degree measured.

As described above, by inverting the first mode to the second mode based on the first deterioration degree and the second deterioration degree, the first mode can be switched to the second mode at an appropriate timing.

In the image display control apparatus, the control unit calculates a difference between the first deterioration degree and the second deterioration degree, and puts into a state where the first mode is capable of switching to the second mode when the difference exceeds a threshold value.

The threshold value is a parameter for determining a cycle for switching the modes. Specifically, when the threshold value is small, the cycle for switching the modes is shortened. On the other hand, if the threshold value is great, the cycle for switching the modes is prolonged.

In the image display control apparatus, the control unit measures the first deterioration degree and the second deterioration degree based on a deterioration factor that is higher as the brightness is higher.

Using the deterioration factor, the first deterioration degree and the second deterioration degree can be measured appropriately.

In the image display control apparatus, the control unit determines which mode of the first mode and the second mode is executed when the image display control apparatus is started to switch the first mode to the second mode.

As described above, the first mode can be switched to the second mode without imparting a strange feeling to a user at an appropriate timing.

In the image display control apparatus, the control unit continues to execute the mode determined when the image display control apparatus is started until the next start.

As described above, the first mode can be switched to the second mode without imparting a strange feeling to a user at an appropriate timing.

In the image display control apparatus, the control unit displays an image for diagnosis on an area other than the area the image is fixedly displayed.

In the image display control apparatus, the image where the brightness is reduced fixedly displayed on the specific area of the screen is displayed on an area around the image for diagnosis.

As described above, the visibility is improved when the user (doctor) performs a diagnostic imaging.

In the image display control apparatus, the control unit analyzes a whole image displayed on the screen to decide the area of the image where the brightness is inverted in the first mode and the second mode, the image being fixedly displayed on the specific area of the screen.

In the image display control apparatus, the control unit switches the first mode to the second mode on a plurality of screens such that respective modes executed on a plurality of the screens are the same mode.

As described above, as the modes executed on a plurality of the screens are common, it is possible to improve the visibility when the user monitors a plurality of the screens.

In the image display control apparatus, the control unit measures deterioration degrees in the areas of a plurality of the screens, decides a screen having the greatest deterioration degree based on the respective deterioration degrees measured, and switches modes of other screens so as to match a mode switching of the screen having the greatest deterioration degree.

As described above, in a plurality of the screens, the problems of the ghosting can be mitigated as appropriate.

In the image display control apparatus, the control unit sets a level of reduction such that the levels of reducing the brightness in the respective modes executed on a plurality of the screens are the same.

As described above, the levels of reducing the brightness (i.e., lightness) in a plurality of the screens are common, it is possible to improve the visibility when the user monitors a plurality of the screens.

An image display system according to the present technology includes a display unit and a control unit.

The control unit switches a first mode for reducing a brightness of an image without inverting the brightness of the image fixedly displayed on a specific area of a screen to a second mode for inverting the brightness of the image and reducing the brightness of the image inverted.

The image display system may include a plurality of the display units. In this case, the control unit may switch the first mode to the second mode on a plurality of screens such that respective modes executed on a plurality of the screens are the same mode.

A method of controlling an image display according to the present technology includes switching a first mode for reducing a brightness of an image without inverting the brightness of the image fixedly displayed on a specific area of a screen to a second mode for inverting the brightness of the image and reducing the brightness of the image inverted; and controlling a display such that the image is displayed on the area of the screen depending on the mode switched.

A program according to the present technology for executing the steps by an image display control apparatus of switching a first mode for reducing a brightness of an image without inverting the brightness of the image fixedly displayed on a specific area of a screen to a second mode for inverting the brightness of the image and reducing the brightness of the image inverted; and controlling a display such that the image is displayed on the area of the screen depending on the mode switched.

Effects of the Invention

As described above, according to the present technology, a technology that can mitigate accurately the ghosting problem can be provided.

MODES FOR CARRYING OUT THE INVENTION

<Fist Embodiment>

Hereinafter, an embodiment of the present technology will be described referring to drawings.

[Overall Configuration of Image Display System 10 and Configuration of Unit]

Figure 1:
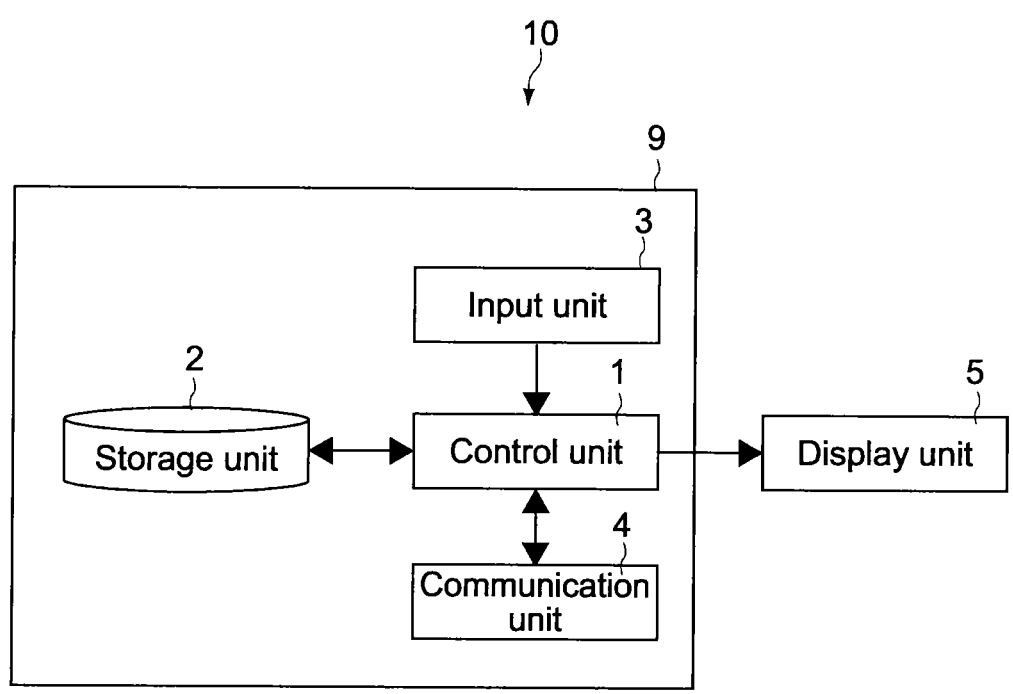
FIG. 1 A diagram for showing an image display system according to an embodiment of the present technology.

FIG. 1 is a diagram for showing an image display system 10 according to the present technology. As shown in FIG. 1, the image display system 10 according to the present technology includes an image display control apparatus 9, and a display apparatus 5 (display unit 5). The image display control apparatus 9 includes a control unit 1, a storage unit 2, an input unit 3, and a communication unit 4.

For the description of the present technology, the image display control apparatus 9 (image display system 10) is used as an image display control apparatus (image display system) for displaying images such as an X ray image, a CT image, an MRI image and the like, as an example. Specifically, it describes the case that the image display control apparatus 9 (image display system 10) is used for diagnostic imaging.

Note that the image display control apparatus 9 (image display system 10) according to the present technology can be used not only for the diagnostic imaging, but also for a variety of other applications. Typically, when an image is fixedly displayed on a specific area of the screen, an image display method according to the present technology is applicable.

The control unit 1 is configured of a CPU (Central Processing Unit) etc. The control unit 1 executes a variety of calculations based on a variety of programs stored on the storage unit 2. Typically, the control unit 1 inverts or reduces brightness of the image fixedly displayed on a screen among the images displayed on the screen of the display unit 5. Processing by the control unit 1 will be described below in detail.

The storage unit 2 includes a volatile memory and a nonvolatile memory. The volatile memory is, for example, configured of an RAM (Random Access Memory). The volatile memory is used as a work area of the control unit 1, and stores temporarily a program used for processing of the control unit 1 or a calculation result.

The nonvolatile memory is configured, for example, of an HD (Hard Disc), a semiconductor memory such as a flash memory, or a combination thereof. The nonvolatile memory stores a variety of programs necessary for processing by the control unit 1. The programs may be read from a portable recording medium such as an optical disc and a semiconductor memory.

Also, the nonvolatile memory stores fixedly an image 11 (see FIG. 2) such as an X ray image used for diagnosis. The image data 11 may be stored in a server apparatus other than the image display control apparatus 9 (image display system 10), for example. In this case, the image data 11 is acquired by the image display control apparatus 9 (image display system 10) via the communication unit 4.

The input unit 3 includes, for example, a keyboard and a mouse. The input unit 3 inputs a variety of user's designations, and outputs them to the control unit 1. The communication unit 4 may send information to other apparatus, or may receive information from other apparatus.

The display unit 5 is configured of an organic EL display where self-emitting type light emitting devices are arrange in matrix. The organic EL display may be a color display type organic EL display or may be a monochrome display type organic EL display.

The display unit 5 may be formed separately from the control unit 1 and the storage unit 2 (for example, when the display unit 5 is separated from a PC (Personal computer)), or may be formed integrally with these (for example, a display unit integrated PC).

The display unit 5 displays the image 11 used for diagnosis, for example, of an X ray image, a CT image, an MRI image or the like depending on the control by the control unit 1. In this sense, the display unit 5 is a display used for diagnostic imaging (called as interpretation) by a doctor. Note that the organic EL display can realize a high contrast, and is excellent in expressing correctly a dark image such as the X ray image, the CT image and the MRI image.

[One Example of Image Before Processing According to Present Technology is Executed]

Figure 2:
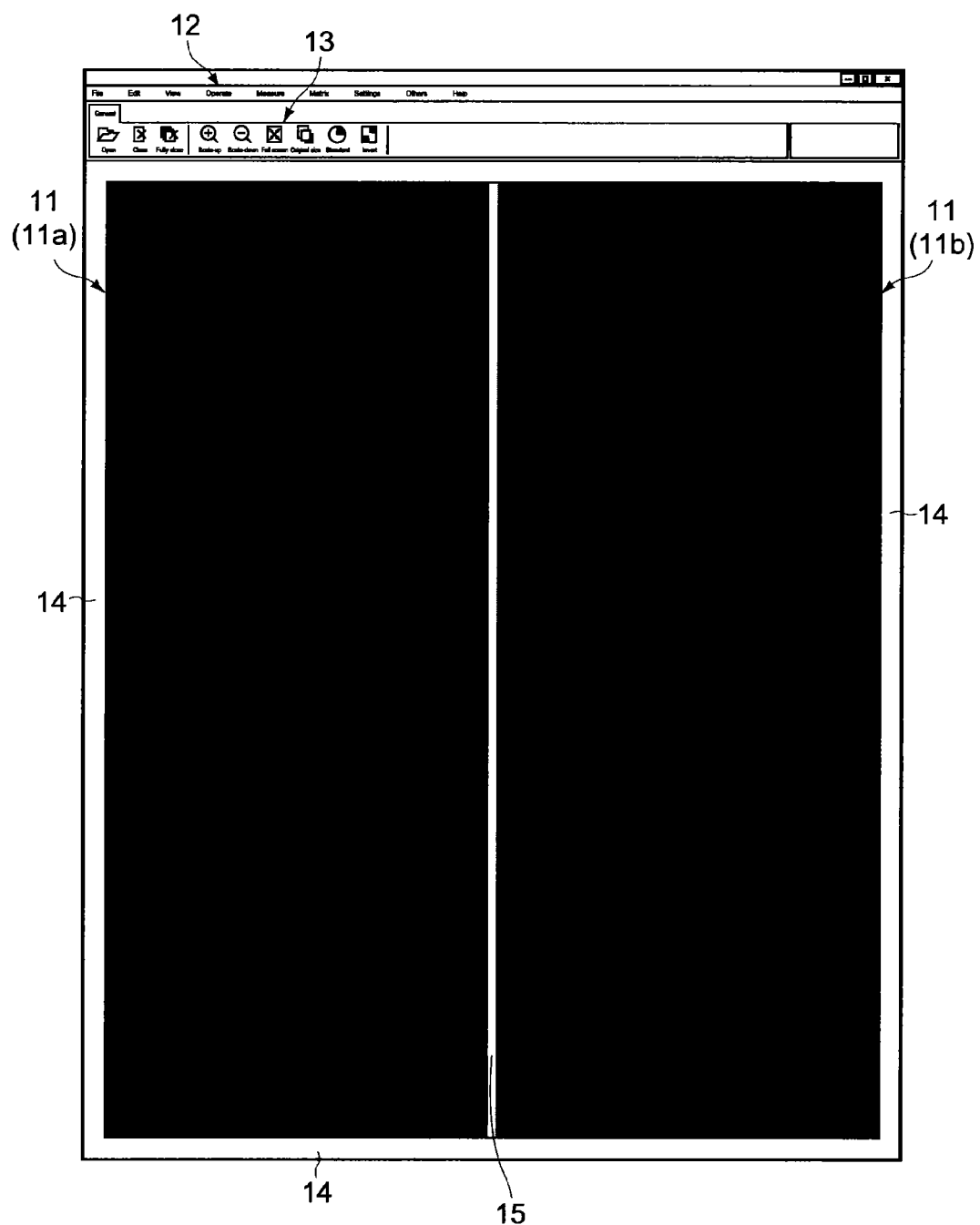
FIG. 2 A diagram for showing one example of an image before processing according to the present technology is executed.

FIG. 2 is a diagram for showing one example of an image before processing according to the present technology is executed. In the image shown in FIG. 2, the brightness of the image fixedly displayed on a specific area of the screen is not inverted nor reduced.

The image shown in FIG. 2 includes roughly an image 11 for diagnosis, a frame 14 for surrounding the image 11 for diagnosis, a menu bar 12 and a tool bar 13 positioned at an upper part of the image 11 for diagnosis.

The image shown in FIG. 2 is often displayed over a whole screen of the display unit 5. In other words, the shown in FIG. 2 is often displayed in a full screen mode. This is because, in the diagnostic imaging (interpretation), it is necessary to display the image 11 for diagnosis as large as possible.

In the example shown in FIG. 2, at a left side area on the screen, an X ray image 11a where one of left and right breasts is displayed, at a right side area on the screen, an X ray image 11b where the other breast is displayed. The X ray image 11 shown in FIG. 2 as the example is captured from sides of the breasts. The doctor views (interprets) the two breasts X ray images 11 to find early a breast cancer. Such a diagnosis is generally called as a mammography diagnosis.

In the description, as the example, the breasts X ray images 11 are displayed on the screen. But an X ray image, a CT image, or an MRI image of other body parts (such as a bone, a tooth, an organ, a blood vessel) may be displayed on the screen.

At a boundary between the X ray image 11a displayed at a left side and the X ray image 11b displayed at a right side, there is displayed a line 15 showing the boundary in a vertical direction. In this example, the line 15 is white in color (in other words, has a high brightness). In the example shown in FIG. 2, the area displaying the X ray image 11 is divided into two, i.e., left and right, as an example. But the area displaying the X ray image 11 may be divided into four, i.e., up, down, left and right.

In the case of dividing into four, two X ray images 11 where two breasts are captured from sides and two X ray images 11 where two breasts are captured from front (or upper), i.e., a total of four X ray images 11 are displayed on the screen. In this case, the line 15 in the vertical direction showing the boundary of the X ray images 11, and a horizontal line are displayed on the screen. In addition, the X ray images having the division number of six, eight or more may be displayed on the screen. In this case, depending on the division number(s), the number of the line 15 in the vertical direction and the horizontal line may be increased.

In FIG. 2, the image of the frame 14 surrounding the two X ray images 11 is displayed on the screen. In this example, the frame 14 is white in color (in other words, has a high brightness). In addition, at an upper part of the two X ray images 11, the images of the menu bar 12 and the tool bar 13 are displayed.

Figure 3:
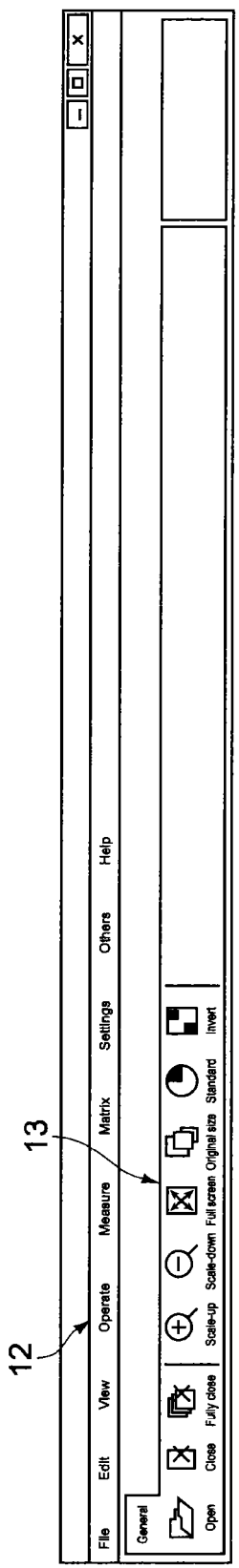
FIG. 3 An enlarged diagram for showing a menu bar and a tool bar.

FIG. 3 is an enlarged diagram for showing the menu bar 12 and the tool bar 13. As shown in FIG. 3, the menu bar 12 is a white base. To the white base, black "file", "edit", "view" and the like are displayed. The tool bar 13 is also white base similar to the menu bar 12, and characters such as black "open", "close" and "fully close" are shown, and black diagrams associated with the above characters are displayed. Between the menu bar 12 and the tool bar 13, or within the tool bar 13, a black line is displayed.

As described above, the images shown in FIG. 2 are often displayed in the full screen mode in view of their nature. In this case, the image 11 for diagnosis such as the X ray image is switched each time a doctor's diagnosis is ended, but the menu bar 12, the tool bar 13, the frame 14, and the line 15 for dividing the image 11 for diagnosis are displayed for a long time at the same positions on the screen.

As the light emitting device configuring the EL display has a feature that it is deteriorated over time, when the same image is displayed at the same position for a long time, a so-called "ghosting" phenomenon may be induced.

As to the menu bar 12 and the tool bar 13, as the light emitting device corresponding to the white bases continues to emit light, the light emitting device that emits light at a relatively high brightness is deteriorated faster than the light emitting device emitting light at a relatively low brightness. On the other hand, as the light emitting device corresponding to a black character, a diagram or a black line continues to emit light at a relatively low brightness, the deterioration speed is low. Attributed to a variation in the deterioration speed, ghosting may be undesirably generated.

A relationship among white bases of the menu bar 12 and the tool bar 13, the white frame 14, the white line 15 for dividing the image 11 for diagnosis, and the dark image 11 for diagnosis will be described.

As the light emitting device corresponding to the white bases of the menu bar 12 and the tool bar 13, the white frame 14, and the white line 15 for dividing the image 11 for diagnosis continues to emit light at a relatively high brightness, the light emitting device is deteriorated fast. On the other hand, as the image 11 for diagnosis is sequentially switched but is basically dark as a whole, the light emitting device corresponding to the image 11 for diagnosis is deteriorated slow. Accordingly, attributed to a variation in the deterioration, ghosting may be undesirably generated (in particular, boundaries among the white frame 14, the white line 15 and the image for diagnosis).

In order to mitigate the ghosting, the brightness may be corrected depending on a deterioration progress status of the light emitting device. However, as the light emitting device is deteriorated, chromaticity is changed. Therefore, if the brightness is corrected, a color unevenness may be generated. In particular, a monochrome display type organic EL display is likely to induce the color unevenness.

In the image display control apparatus 9 (image display system 10) according to the embodiment, the brightness of the image fixedly displayed on the screen is inverted or reduced, thereby executing processing to mitigate the ghosting and the color unevenness.

[Operation Description]

Figure 4:
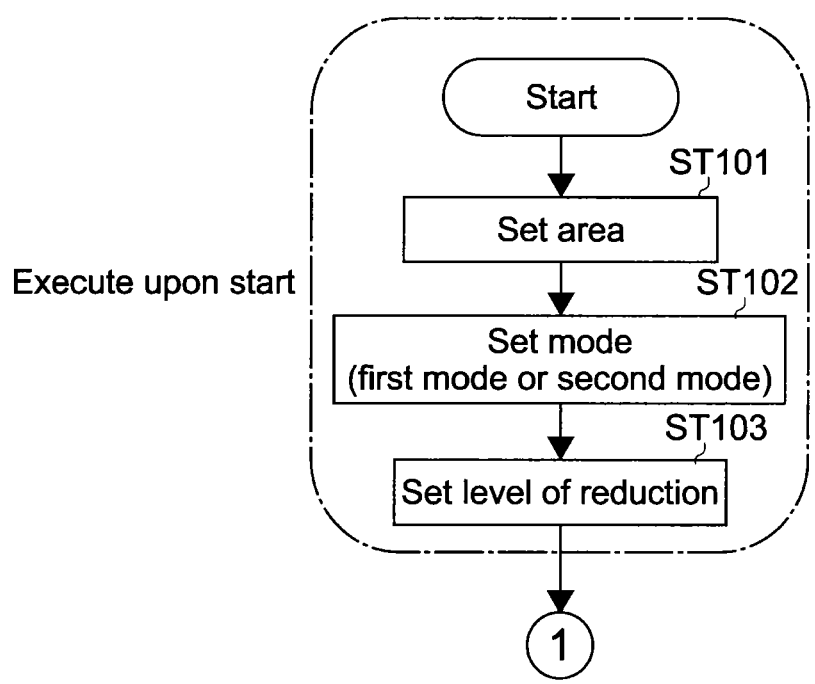
FIG. 4 A flow chart showing processing of the image display control apparatus according to an embodiment of the present technology.
Figure 5:
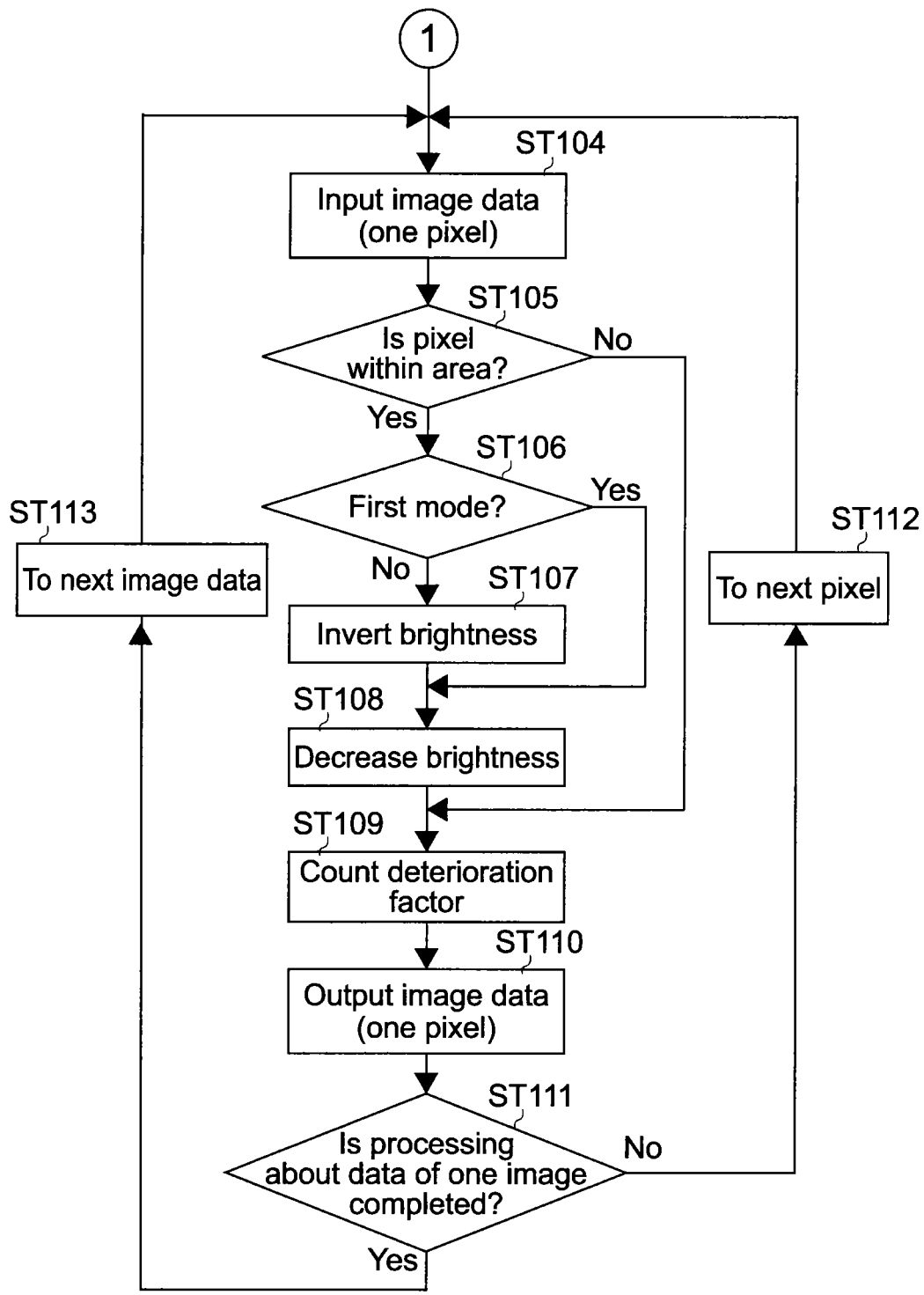
FIG. 5 A flow chart showing processing of the image display control apparatus according to an embodiment of the present technology.

Next, processing by the image display control apparatus 9 (image display system 10) according to the embodiment will be described. FIG. 4 and FIG. 5 are flow charts showing the processing by the image display control apparatus 9 according to the embodiment.

In the embodiment, the control unit 1 executes processing to switch the first mode and the second mode by executing the processing shown in FIG. 4 and FIG. 5. The first mode is to reduce the brightness of the image without inverting the brightness of the image fixedly displayed on the specific area of the screen. The second mode is to invert the brightness of the image, and reduce the brightness of the image inverted.

Figure 6:
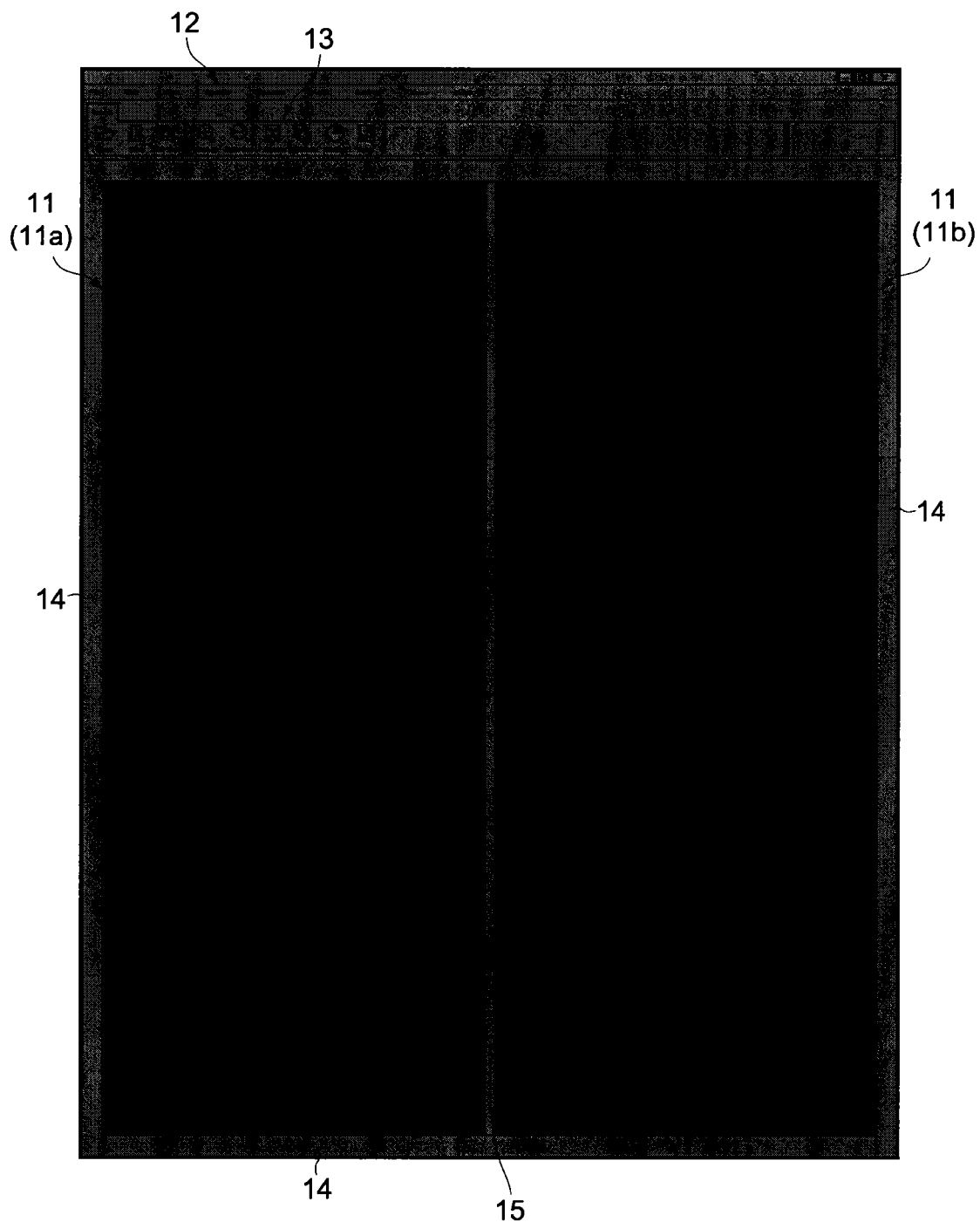
FIG. 6 A diagram for showing one example of an image displayed on a screen when a first mode is executed.
Figure 7:
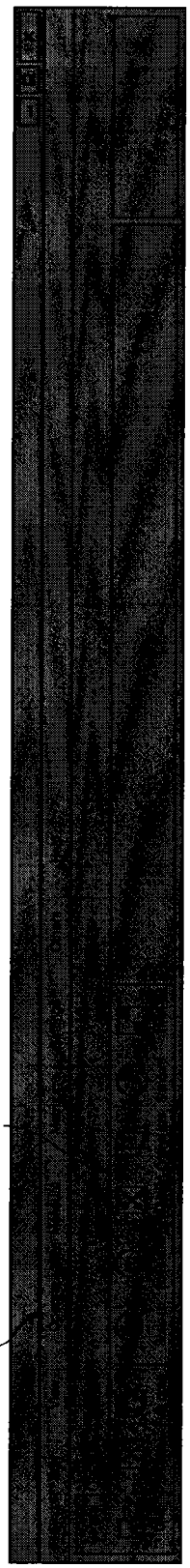
FIG. 7 An enlarged diagram for showing a menu bar and a tool bar in the first mode.

FIG. 6 is a diagram for showing one example of an image displayed on a screen when a first mode is executed. FIG. 7 is an enlarged diagram for showing the menu bar 12 and the tool bar 13 in the first mode.

Figure 8:
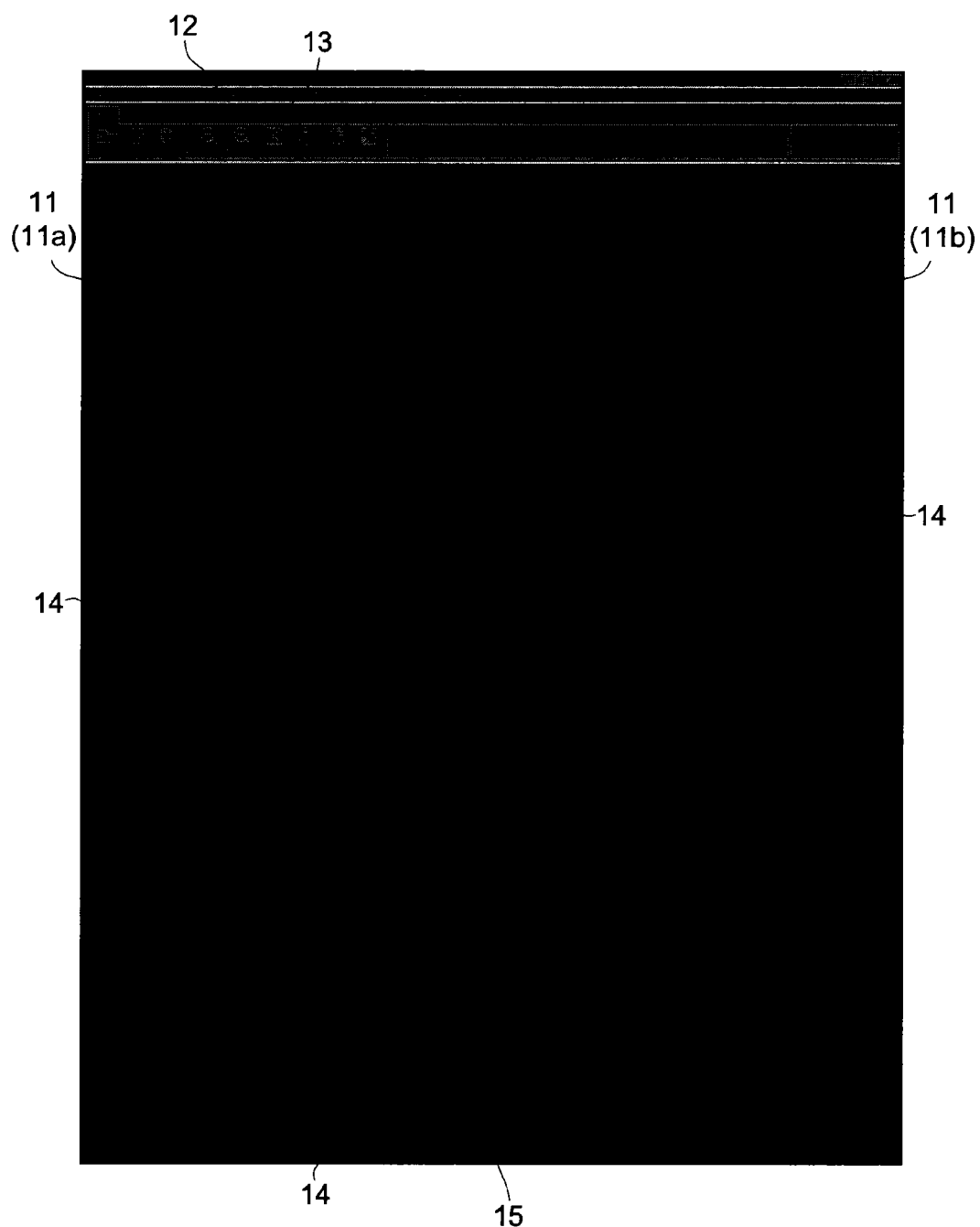
FIG. 8 A diagram for showing one example of an image displayed on a screen when a second mode is executed.
Figure 9:
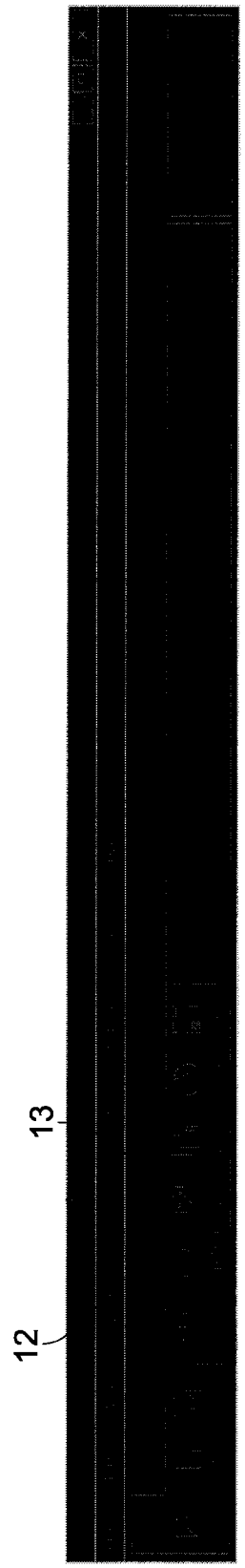
FIG. 9 An enlarged diagram for showing a menu bar and a tool bar in the second mode.

FIG. 8 is a diagram for showing one example of an image displayed on a screen when a second mode is executed. FIG. 9 is an enlarged diagram for showing the menu bar 12 and the tool bar 13 in the second mode.

The images shown in FIG. 6, FIG. 7, FIG. 8 and FIG. 9 are similar to the images shown in FIG. 2 and FIG. 3 except that the brightness of the images fixedly displayed on the specific area of the screen are inverted or reduced. In other words, the images shown in FIG. 6 and FIG. 8 are displayed in a full screen mode. The images shown in FIG. 6 and FIG. 8 each includes the image 11 for diagnosis, the frame 14 for surrounding the image 11 for diagnosis, the menu bar 12 and the tool bar 13 positioned at the upper part of the image 11 for diagnosis.

In the example shown in FIG. 6 and FIG. 8, the image fixedly displayed on the screen includes the menu bar 12 and the tool bar 13 positioned at the upper part of the image 11 for diagnosis, the frame 14 for surrounding the image 11 for diagnosis, and the line 15 for dividing the image 11 for diagnosis.

Referring to FIG. 4, when the image display control apparatus 9 (image display system 10) is started, the control unit 1 firstly sets an area on the screen where the brightness is inverted or reduced (step 101). The area where the brightness is inverted or reduced is namely the area on the screen where the same image is fixedly displayed.

There are two ways to set the area: Firstly, an operator manually inputs the area on the screen on which the same image is fixedly displayed to store the area to the storage unit 2 in advance.

For example, after the operator displays the image shown in FIG. 2 on the display unit 5, the operator designates the positions where the frame 14 for surrounding the image 11 for diagnosis, the menu bar 12 and the tool bar 13, and the line 15 for dividing the image 11 for diagnosis are displayed via the input unit 3. If there are a plurality of the lines 15 for dividing the image 11 for diagnosis, a plurality of the lines 15 are designated.

In this manner, the area on which the same image is fixedly displayed, i.e., the area of the screen where the brightness is reduced or inverted, is stored in the storage unit 2 in advance. Then, the control unit 1 reads out the area from the storage unit 2 upon start, thereby setting the area where the brightness is reduced or inverted.

Secondly, by automatically judging the area on the screen on which the same image is fixedly displayed by the control unit 1 when the image display control apparatus 9 (image display system 10) is started, the area where the brightness is reduced or inverted is set. In this case, the control unit 1 may automatically decide the positions where the frame 14 for surrounding the image 11 for diagnosis, the menu bar 12 and the tool bar 13, and one or more line(s) 15 for dividing the image 11 for diagnosis are displayed by analyzing a whole image on the screen shown in FIG. 2, for example.

Next, the control unit 1 determines which mode is executed from the first mode and the second mode, and sets the mode (step 102). A detail about how to determine which mode is executed by the control unit 1 will be described later.

The control unit 1 determines which mode is executed when the image display control apparatus 9 (image display system 10) is started, the mode determined continues to be executed until the next start. In other words, a timing to switch from the first mode to the second mode is the start of the image display control apparatus 9 (image display system 10). After the image display control apparatus 9 (image display system 10) is started, the first mode is not switched to the second mode.

In this manner, the first mode can be switched to the second mode at an appropriate timing without imparting a strange feeling to a user (doctor). It is possible to, however, switch the first mode to the second mode after the image display control apparatus 9 (image display system 10) is started.

The control unit 1 sets the mode, and then reads a level of reduction stored in the storage unit 2 to set a level of reduction (step 103). The level of reduction is a value showing the level of reducing the brightness in the area on the screen on which the same image is fixedly displayed. The level of reduction is stored to the storage unit 2 in advance by the input via the input unit 3, for example. The level of reduction is determined in view of the visibility by the user (doctor). The level of reduction may be changed via the input unit 3.

For the first level of reduction in the first mode and the second level of reduction in the second mode, the same value is typically used. FIG. 6, FIG. 7, FIG. 8 and FIG. 9 each is one example of the case that the first level of reduction and the second level of reduction have the same value.

Referring to FIG. 5, the control unit 1 inputs image data for one pixel to the image shown in FIG. 2, for example (step 104). Next, the control unit 1 decides whether or not the pixel is within the area set in step 101 (step 105). Specifically, the control unit 1 decides whether or not the pixel is within the area on the screen on which the same image is fixedly displayed.

When the pixel is within the area (YES in step 105), the control unit 1 decides whether or not the current mode is the first mode (step 106).

When the current mode is the first mode (YES in step 106), the control unit 1 reduces the brightness of the pixel without inverting the brightness (step 108). In step 108, the control unit 1 reduces the brightness of the pixel depending on the level of reduction set in step 103.

The brightness is reduced in accordance with the following equation (1).

$$LV_{dwn\text{-}out} = \text{level of reduction} \times LV_{dwn\text{-}in} \quad (1)$$

In the equation (1), the $LV_{dwn\text{-}out}$ represents the level of the brightness when the brightness is reduced and outputted. The $LV_{dwn\text{-}in}$ represents an input value of the brightness to be reduced.

After the control unit 1 reduces the brightness without inverting the brightness, it proceeds to next step 109.

In step 106, when the current mode is not the first mode (NO in step 106), i.e., when the current mode is the second mode, the control unit 1 inverts the brightness of the pixel (step 107).

The brightness is inverted in accordance with the following equation (2).

$$LV_{rvs\text{-}out} = \text{maximum level of brightness} - LV_{rvs\text{-}in} \quad (2)$$

In the equation (2), the $LV_{rvs\text{-}out}$ represents a level of the brightness when the brightness is inverted and outputted. The maximum level of the brightness is 255 in 256 color gradations. The $LV_{rvs\text{-}in}$ represents an input value of the brightness to be inverted.

When the brightness of the pixel is inverted, the control unit 1 reduces the brightness of the pixel using the above-described equation (1) (step 108).

After the brightness of the pixel is inverted and the brightness is reduced, the control unit 1 proceeds to next step 109.

In step 105, when the pixel is not within the area on the screen on which the same image is fixedly displayed (NO in step 105), the control unit 1 does not invert the brightness and not reduce brightness, it proceeds to next step 109. For example, it decides that the pixel corresponding to the position where the image 11 for diagnosis is displayed is not within the above-described area, and brightness is not inverted and the brightness is not reduced.

In step 109, the control unit 1 counts the deterioration factor per pixel. As the higher the brightness is, the higher the deterioration factor is. By counting the deterioration factor, the control unit 1 measures the first deterioration degree for the first part within the area that is represented at a relatively high brightness in the first mode and is represented at a relatively low brightness in the second mode. In addition, the control unit 1 measures the second deterioration degree for the second part within the area that is represented at a relatively low brightness in the first mode and is represented at a relatively high brightness in the second mode.

In the examples shown in FIG. 6 and FIG. 8, the first part corresponds to the bases of the menu bar 12 and the tool bar 13, the frame 14, and the line 15 for dividing the image 11 for diagnosis. The second part corresponds to characters, diagrams, lines within the menu bar 12 and the tool bar 13.

Figure 10:
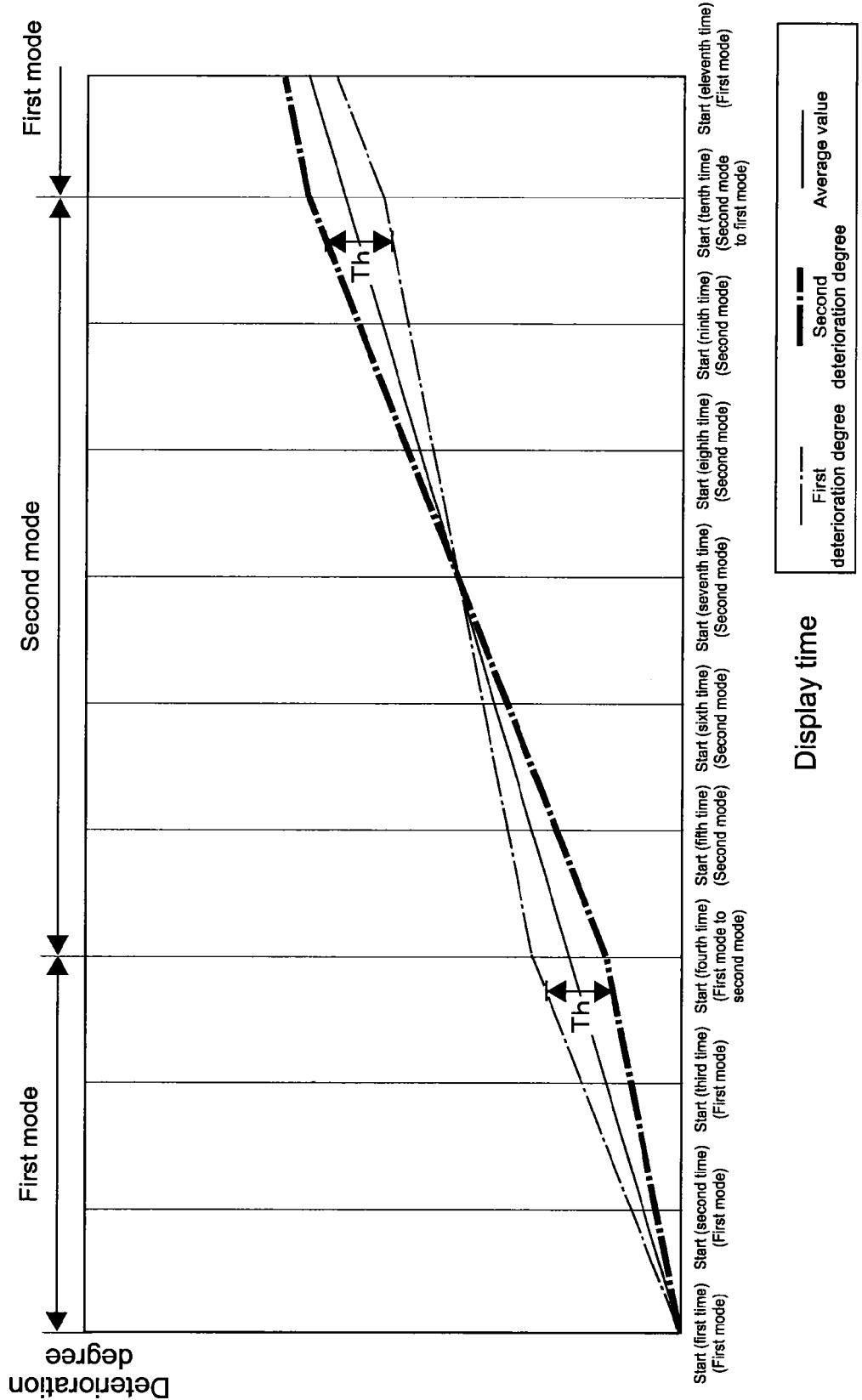
FIG. 10 A diagram for showing a relationship among an image display time, a first deterioration degree of a first part and a second deterioration degree of a second part.

FIG. 10 shows a relationship among an image display time, the first deterioration degree of the first part and the second deterioration degree of the second part. In FIG. 10, the first deterioration degree is represented by a narrow long dashed short dashed line, and the second deterioration degree is represented by a thick long dashed short dashed line. The control unit 1 counts the deterioration factor, thereby measuring the first deterioration degree and the second deterioration degree shown in FIG. 10. The deterioration factor corresponds to a slope of a straight line representing the first deterioration degree and the second deterioration degree.

The first deterioration degree and the second deterioration degree measured are used when it is decided that the control unit 1 executes which mode of the first mode and the second mode.

The deterioration degree is measured not only for the pixel (light emitting device) corresponding to the area on the screen on which the same image is fixedly displayed, but also for the pixel (light emitting device) corresponding to other areas (areas where the image 11 of diagnosis is displayed) (see NO in step 105 thru step 109). The deterioration degree, the first deterioration degree and the second deterioration degree are used when the brightness is corrected by the control unit 1. These deterioration degrees are measured (counted) per refresh rate, and the deterioration degrees measured are stored in the storage unit 2.

After the deterioration factors are counted, the control unit 1 outputs the image data per one pixel (step 110). Next, the control unit 1 decides whether or not processing from step 104 to step 110 for all pixels included in data of one image (step 111). When there remains the pixel(s) not yet processed (NO in step 111), the control unit 1 proceeds the step to next pixel (step 112), and the processing from step 104 to 110 is executed on next pixel.

When the processing from step 104 to 110 is completed for all pixels included in data of one image (YES in step 111), the control unit 1 proceeds to next image data (step 113). Then, the control unit 1 repeats the processing from step 104 to 110 for next image data.

By the processing, in the first mode, an images shown in FIG. 6 is displayed on the screen. In the second mode, an images shown in FIG. 8 is displayed on the screen.

As shown in FIG. 6, in the first mode, in contrast to the original image data shown in FIG. 2, the pixel (light emitting device) corresponding to the area on the screen on which the same image is fixedly displayed has reduced brightness. In the first mode, in contrast to the original image data shown in FIG. 2, the brightness is not inverted.

Specifically, brightness in the bases of the menu bar 12 and the tool bar 13, the frame 14, and the lines 15 for dividing the image 11 for diagnosis is reduced and changed to grey. Although the brightness of the characters, the diagrams and the lines in the menu bar 12 and the tool bar 13 is more or less reduced, these are originally dark in the original image data shown in FIG. 2, and a level of the reduction is as low as invisible. When the brightness of the original image data is zero, there is no change.

As shown in FIG. 8, in the second mode, to the original image data shown in FIG. 2, the brightness is inverted and reduced in the pixel (light emitting device) corresponding to the area on the screen on which the same image is fixedly displayed.

Specifically, the brightness in the bases of the menu bar 12 and the tool bar 13, the frame 14, and the lines 15 for dividing the image 11 for diagnosis is reduced, and they are changed to black in color. Also, the brightness in the characters, the diagrams and the lines within the menu bar 12 and the tool bar 13 is reduced and changed to grey.

(Switching from First Mode to Second Mode)

Next, processing to determine which mode of the first mode and the second mode is executed by the control unit 1 upon start will be described.

Figure 11:
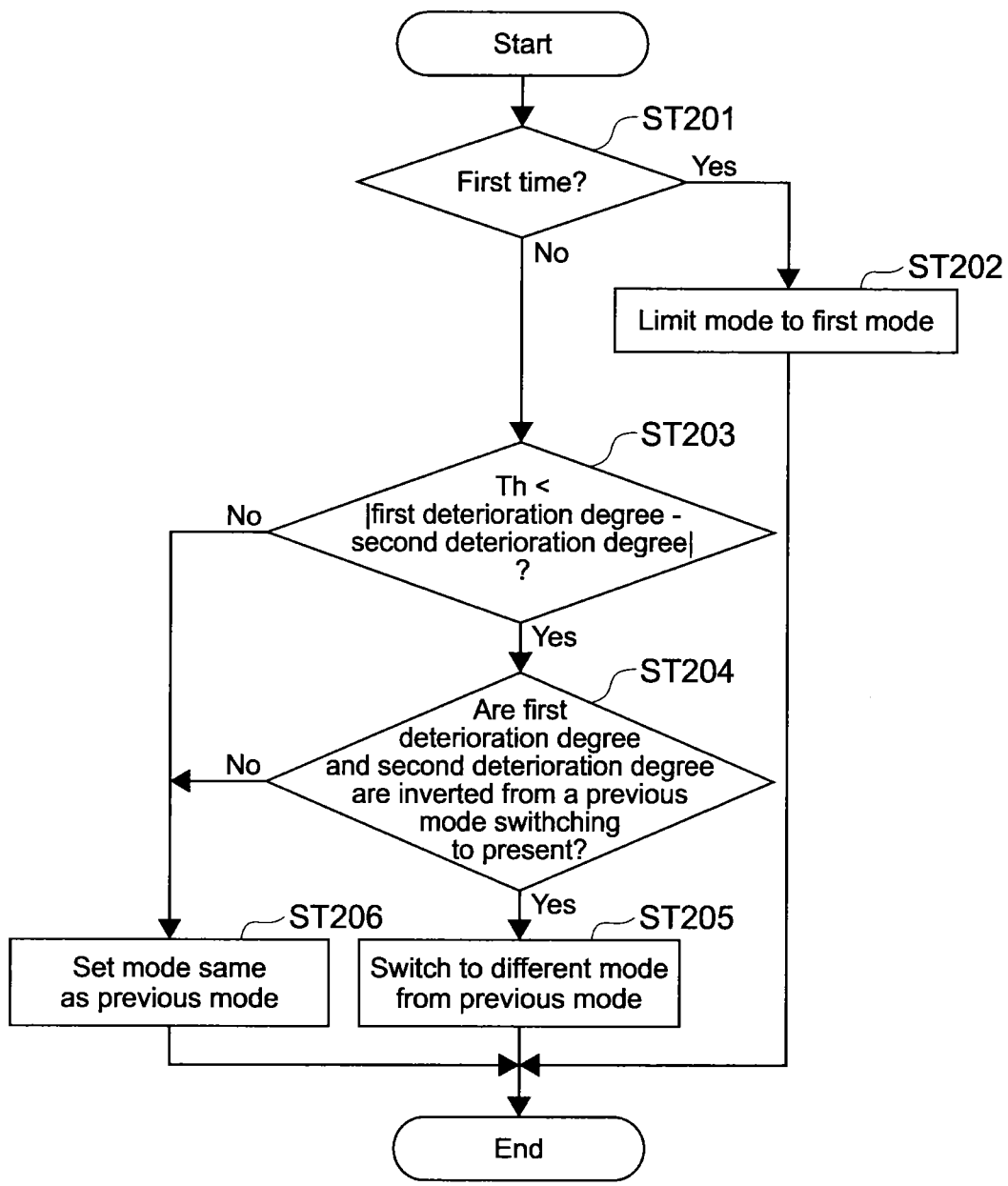
FIG. 11 A flow chart showing processing for determining which mode is executed.

FIG. 11 is a flow chart showing processing for determining which mode is executed. In the description about FIG. 11, FIG. 10 is also referred.

FIG. 10 shows a transition from the first deterioration degree (see the narrow long dashed short dashed line) to the second deterioration degree (see the thick long dashed short dashed line) when the mode is switched by the processing shown in FIG. 11. In FIG. 10, the average of the first deterioration degree and second deterioration degree is shown by a solid line.

The first deterioration degree is the deterioration degree of the pixel (light emitting device) of the bases of the menu bar 12 and the tool bar 13, the white frame 14, and the white line 15 for dividing the image 11 for diagnosis (first part). On the other hand, the second deterioration degree is the deterioration degree of the pixel (light emitting device) of the characters, the diagrams and the lines of the menu bar 12 and the tool bar 13 (second part).

Firstly, the control unit 1 decides whether or not the start at this time is the first time after the program according to the present technology is installed (step 201). When it is the start is for the first time, the control unit 1 sets any of the first mode and the second mode that is set in advance (step 202). In the description herein, it is assumed that the first mode is set at the start for the first time. In step 202, when the mode is set to the first mode, the control unit 1 ends the processing.

When the start at this time is not the first time (NO in step 201), the control unit 1 calculates a difference between the first deterioration degree and the second deterioration degree, and decides whether or not an absolute value of the difference exceeds a threshold value Th (step 203). The threshold value is a parameter for determining a cycle for switching the modes. Specifically, when the threshold value is small, the cycle for switching the modes is shortened. On the other hand, if the threshold value is great, the cycle for switching the modes is prolonged. The cycle for switching the modes can be any cycle including one day cycle, one week cycle, one month cycle (for example, when it is used for 10 hours per day).

When the absolute value of the difference between the first deterioration degree and the second deterioration degree is not more than the threshold value Th (NO in step 203), the control unit 1 sets the mode at this time to the mode same as the previous mode (step 206).

When the absolute value of the difference between the first deterioration degree and the second deterioration degree exceeds the threshold value Th (YES in step 203), the control unit 1 proceeds to next step 204. When the absolute value of the difference between the first deterioration degree and the second deterioration degree exceeds the threshold value Th, the mode can be switched. In step 204, the control unit 1 decides whether or not the first deterioration degree and the second deterioration degree are inverted from a previous mode switching to the present.

When the first deterioration degree and the second deterioration degree are not inverted from the previous mode switching to the present (NO in step 204), the control unit 1 set the mode at present to the mode same as the previous one (step 206).

On the other hand, when the first deterioration degree and the second deterioration degree are inverted from the previous mode switching to the present (YES in step 204), the mode at present is set to a mode different from the previous mode (step 205). When the mode set for the first time is not yet switched to other mode, the control unit 1 does not execute step 204 and proceeds to step 205 as long as the result from step 203 is positive. Then, the control unit 1 switches the mode set for the first time to other mode.

Referring to FIG. 10, at the start for the first time, the first mode is set. Accordingly, after the start for the first time, the image shown in FIG. 6 is displayed on the screen. While the image is displayed on the screen, by the processing shown in FIG. 5, the first deterioration degree and the second deterioration degree are measured.

Upon the start for the second or third time, the absolute value of the difference between the first deterioration degree and the second deterioration degree does not exceed the threshold value Th. Accordingly, upon the start for the second or third times, the mode same as the previous mode (the first mode) is set.

Upon the start for the fourth time, as the mode set for the first time is not yet switched to other mode, and the absolute value of the difference between the first deterioration degree and the second deterioration degree exceeds the threshold value Th, the first mode set for the first time is switched to the second mode. Accordingly, after the fourth start, the image shown in FIG. 8 is displayed on the screen. Since the brightness of the first mode and the second mode is inverted, the slope of the first deterioration degree and the second deterioration degree is inverted.

Upon the start for the fifth, sixth or seventh time, the absolute value of the difference between the first deterioration degree and the second deterioration degree does not exceed the threshold value Th. In addition, upon the start for the fifth, sixth or seventh time, the first deterioration degree and the second deterioration degree are not inverted from the previous mode switching to the present. Accordingly, upon the start for the fifth, sixth or seventh time, the previous mode is referred to set the second mode same as the previous mode.

Upon the start for the eighth or ninth time, although the first deterioration degree and the second deterioration degree are inverted from the previous mode switching to the present, the absolute value of the difference between the first deterioration degree and the second deterioration degree does not exceed the threshold value Th. Accordingly, upon the start for the eighth or ninth time, the previous mode is referred to set the second mode same as the previous mode.

Upon the start for the tenth time, the absolute value of the difference between the first deterioration degree and the second deterioration degree exceeds the threshold value Th. Upon the start for the tenth time, the first deterioration degree and the second deterioration degree are inverted from the previous mode switching to the present. Accordingly, upon the tenth start, the previous mode is switched to set the first mode.

As described above, by switching the mode based on the first deterioration degree and the second deterioration degree, the mode can be switched at an appropriate timing.

[Actions]

As described above, according to the embodiments, in the first mode and the second mode, the brightness of the image fixedly displayed on the specific area of the screen is inverted. In this manner, the part that is represented at a relatively high brightness and the part that is represented at a relatively low brightness are inverted in the first mode and the second mode. Accordingly, as the deterioration speed of the light emitting device within the area where the image is fixedly displayed can be uniform (see FIG. 9), the problems of the ghosting and the color unevenness can be mitigated.

Furthermore, according to the embodiments, in both modes of the first mode and the second mode, the brightness of the image fixedly displayed on the specific area of the screen is reduced. In this manner, a difference between the deterioration speeds of the part that is represented at a relatively high brightness and the part that is represented at a relatively low brightness can be small. Accordingly, the problems of the ghosting and the color unevenness can be mitigated with higher accuracy. In addition, as the brightness of the image fixedly displayed on the specific area of screen is reduced, the deterioration speed of the light emitting device can be slowed.

Furthermore, according to the embodiment, the brightness of the image displayed around the image 11 for diagnosis such as the menu bar 12, the tool bar 13 and the frame 14 is reduced. In this manner, as the brightness of the image displayed around the image 11 for diagnosis is reduced, the image 11 for diagnosis is advantageously easy to see, which will be described hereinbelow.

Figure 12:
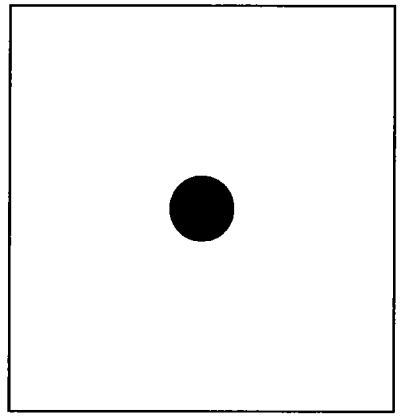
FIG. 12 Diagrams for explaining a reason that an image for diagnosis is easy to see.
Figure 12:
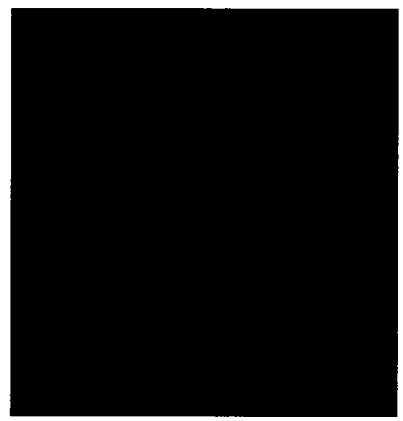

FIG. 12 are diagrams for explaining a reason that the image 11 for diagnosis is easy to see. An upper diagram in FIG. 12 shows a black circle surrounded by a high brightness part. Within the black circle, five grey circles are present. Although shown in the upper diagram in FIG. 12, the five grey circles present within the black circle are very difficult to see. This is because the pupils of the eyes should be dilated in order to find the difference at a low brightness area, but the pupils of the eyes are dilated by the high brightness part present around the black circle.

In a lower diagram in FIG. 12, five grey circles having the same brightness are present at the same positions of the upper drawing in FIG. 12. In the lower diagram in FIG. 12, the surrounding has the low brightness, thereby seeing them with the pupils of the eyes being dilated. Accordingly, the five grey circles are distinguished easier than the upper diagram in FIG. 12.

The upper diagram in FIG. 12 corresponds to the image shown in FIG. 2. On the other hand, the low diagram in FIG. 12 correspond to the images shown in FIG. 6 and FIG. 8. In other words, according to the embodiment, the brightness of the image displayed around the image 11 for diagnosis such as the menu bar 12, the tool bar 13 and the frame 14 is reduced, thereby easily find the difference in the low brightness area in the image for diagnosis when a user (doctor) performs a diagnostic imaging. This leads to an improvement of a diagnosis accuracy.

<Second Embodiment>

Next, a second embodiment of the present technology will be described. In the description of the second embodiment, configurations and functions similar to the above-described first embodiment are denoted by the same symbols, and thus detailed description thereof will be omitted or simplified.

In the second embodiment, two or more display units 5 may be simulated. In this case, when a mode executed by a specific display unit 5 is different from a mode executed by other display unit 5, the visibility may be deteriorated. For example, when the image shown in FIG. 6 is displayed on a specific display unit 5, but the image shown in FIG. 8 is displayed on other display unit 5, the visibility may be deteriorated.

According to the second embodiment, the control unit 1 switches the first mode and the second mode in two or more display units 5 such that the respective modes executed in two or more display units 5 are the same.

Figure 13:
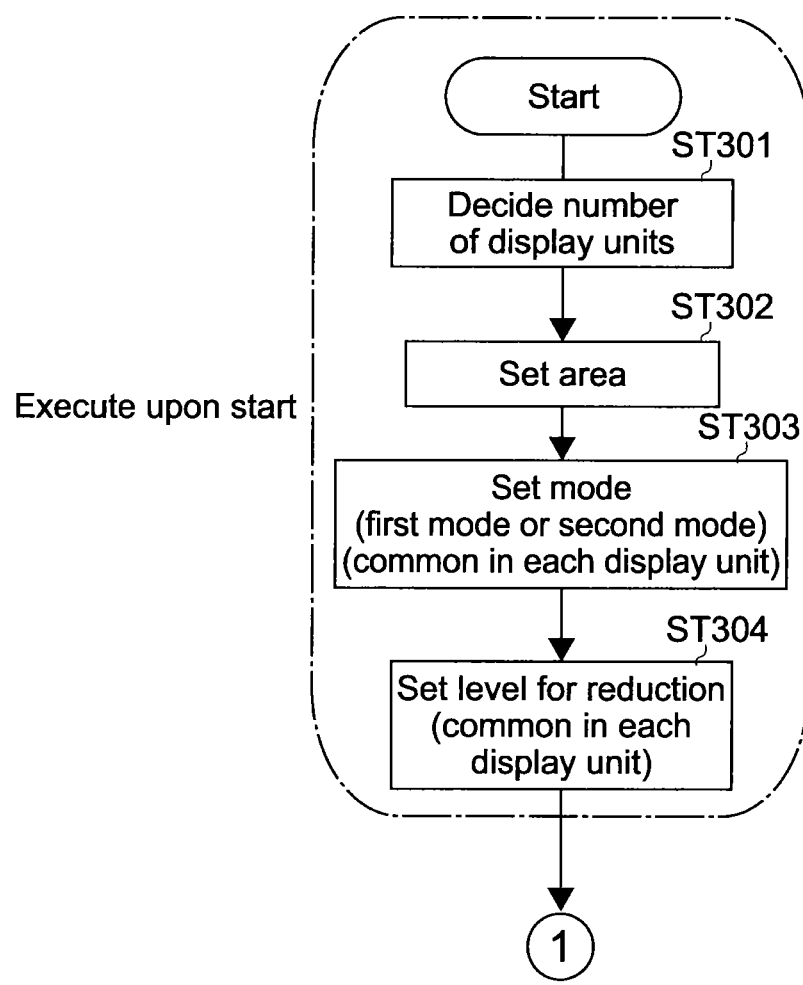
FIG. 13 A flow chart showing processing executed by an image display control apparatus according to other embodiment of the present technology.

FIG. 13 is a flow chart showing processing executed by an image display control apparatus 9 (image display system 10) according to the second embodiment.

Firstly, the control unit 1 decides the number of the display units 5 (step 301). The number of the display units 5 may be two, three or more.

Next, the control unit 1 sets areas for inverting or reducing the brightness (i.e., areas where the same image is fixedly displayed on the screen) in the respective display units 5 (step 302). A way to set the areas is similar to that in the above-described first embodiment. Note that different images are displayed on the respective display units 5. Accordingly, the areas may be different in the respective display units 5.

Next, the control unit 1 determines which mode of the first mode and the second mode is executed, and sets the mode (step 303). The mode set in each display unit 5 is common. In this manner, it is possible to improve the visibility when the user (doctor) monitors two or more display units 5.

Note that, in step 303, the control unit 1 may decide the display unit 5 having the greatest deterioration degree, and switch the mode of other display units 5 so as to match the mode switching of the display unit 5 having the greatest deterioration degree.

In other words, the control unit 1 measures the deterioration degree of the pixel (light emitting device) in the area where the same image is fixedly displayed on the screen for two or more display units 5. As the deterioration degree here, the average value of the first deterioration degree and the second deterioration degree shown in FIG. 10 is used, for example. Then, the control unit 1 decides the display unit 5 having the greatest deterioration degree, based on each deterioration degree measured.

Thereafter, the control unit 1 switches the mode of other display units 5 so as to match the mode switching of the display unit 5 having the greatest deterioration degree. A method to switch the mode of the display unit 5 having the greatest deterioration degree is similar to that in the above-described first embodiment (see FIGS. 10 and 11).

Here, when two or more display units 5 are used at the same time, it is thought that the deterioration degrees of the respective pixels (light emitting devices) in two or more display units 5 are substantially the same. There may be the case that the display unit 5 is already used, and thereafter other display units 5 (often new ones) are added. In this case, it is effective to match the mode switching of the display unit 5 having the greatest deterioration degree.

In other words, by matching the mode switching of the display unit 5 having the greatest deterioration degree with the mode switching of other display units 5, the ghosting and the color unevenness of the display unit 5 having the greatest deterioration degree are mitigated. For the display units 5 newly added, even if the mode is switched in response to the mode switching of the display unit 5 having the greatest deterioration degree, the cycle for switching the modes is basically fixed. Therefore, it is possible to switch the mode without no ghosting nor color unevenness.

After the mode is set, the control unit 1 then sets a level for reduction such that the levels of reducing the brightness in the respective modes executed by two or more display units 5 are the same. In this manner, the levels of reducing the brightness (i.e., lightness) in the respective modes of two or more display units 5 are common, it is possible to improve the visibility when the user (doctor) monitors two or more display units 5.

Note that it may be possible to set the level for reduction of the brightness in other display units 5 so as to match the level for reduction of the brightness in the display unit 5 having the greatest deterioration degree.

After the level for reduction is set, the control unit 1 executes processing shown in FIG. 5 for the respective display units 5.

<Modification Embodiments>

In the above description, based on the first deterioration degree and the second deterioration degree, the first mode is switched to the second mode. Alternatively, based on the time, the first mode may be switched to the second mode. In this case, once the time when the images are displayed on the screen reach a predetermined time, one mode is switched to the other mode.

In the above description, the first level of reduction in the first mode is same as the second level of reduction in the second mode. Alternatively, the first level of reduction may be different from the second level of reduction. For example, the visibility is better in the case that black characters and diagrams are displayed on a gray base as shown in FIG. 7 as compared with the case that grey characters and diagrams are displayed on a block base as shown in FIG. 9. Consequently, it may be thought that the first level of reduction is greater than the second level of reduction.

The present technology may have the following configurations.

(1) An image display control apparatus, including:
    a control unit for switching a first mode for reducing a brightness of an image without inverting the brightness of the image fixedly displayed on a specific area of a screen to a second mode for inverting the brightness of the image and reducing the brightness of the image inverted; and for controlling a display such that the image is displayed on the area of the screen depending on the mode switched.

(2) The image display control apparatus according to (1) above, in which
    the control unit measures a first deterioration degree for a first part within an area that is represented at a relatively high brightness in the first mode and is represented at a relatively low brightness in the second mode, and a second deterioration degree for a second part within an area that is represented at a relatively low brightness in the first mode and is represented at a relatively high brightness in the second mode, and switches the first mode to the second mode base on the first deterioration degree and the second deterioration degree measured.

(3) The image display control apparatus according to (2) above, in which
    the control unit calculates a difference between the first deterioration degree and the second deterioration degree, and puts into a state where the first mode is capable of switching to the second mode when the difference exceeds a threshold value.

(4) The image display control apparatus according to (2) or (3) above, in which
    the control unit measures the first deterioration degree and the second deterioration degree based on a deterioration factor that is higher as the brightness is higher.

(5) The image display control apparatus according to any one of (1) to (4) above, in which
    the control unit determines which mode of the first mode and the second mode is executed when the image display control apparatus is started to switch the first mode to the second mode.

(6) The image display control apparatus according to (5) above, in which
    the control unit continues to execute the mode determined when the image display control apparatus is started until the next start.

(7) The image display control apparatus according to any one of (1) to (6) above, in which
    the control unit displays an image for diagnosis on an area other than the area the image is fixedly displayed.

(8) The image display control apparatus according to (7) above, in which
    the image where the brightness is reduced fixedly displayed on the specific area of the screen is displayed on an area around the image for diagnosis.

(9) The image display control apparatus according to any one of (1) to (8) above, in which
    the control unit analyzes a whole image displayed on the screen to decide the area of the image where the brightness is inverted in the first mode and the second mode, the image being fixedly displayed on the specific area of the screen.

(10) The image display control apparatus according to any one of (1) to (9) above, in which
    the control unit switches the first mode to the second mode on a plurality of screens such that respective modes executed on a plurality of the screens are the same mode.

(11) The image display control apparatus according to (10) above, in which
    the control unit measures deterioration degrees in the areas of a plurality of the screens, decides a screen having the greatest deterioration degree based on the respective deterioration degrees measured, and switches modes of other screens so as to match a mode switching of the screen having the greatest deterioration degree.

(12) The image display control apparatus according to (10) or (11) above, in which
    the control unit sets a level of reduction such that the levels of reducing the brightness in the respective modes executed on a plurality of screens are the same.

(13) An image display system, including:
    a display unit; and
    a control unit for switching a first mode for reducing a brightness of an image without inverting the brightness of the image fixedly displayed on a specific area of a screen to a second mode for inverting the brightness of the image and reducing the brightness of the image inverted; and for controlling a display such that the image is displayed on the area of the screen depending on the mode switched.

(14) The image display system according to (13) above, including a plurality of the display units, in which
    the control unit switches the first mode to the second mode on a plurality of screens such that respective modes executed on a plurality of the screens are the same mode.

(15) A method of controlling an image display, including:
    switching a first mode for reducing a brightness of an image without inverting the brightness of the image fixedly displayed on a specific area of a screen to a second mode for inverting the brightness of the image and reducing the brightness of the image inverted; and controlling a display such that the image is displayed on the area of the screen depending on the mode switched.

(14) A program for executing the steps by an image display control apparatus, including:

switching a first mode for reducing a brightness of an image without inverting the brightness of the image fixedly displayed on a specific area of a screen to a second mode for inverting the brightness of the image and reducing the brightness of the image inverted; and controlling a display such that the image is displayed on the area of the screen depending on the mode switched.

DESCRIPTION OF REFERENCE NUMERALS 1 control unit
2 storage unit
3 input unit
4 communication unit
5 display unit
9 image display control apparatus
10 image display system
11 image used for diagnosis (X ray image)
12 menu bar
13 tool bar
14 frame
15 line

The invention claimed is:

1. An image display control apparatus, comprising:
control circuitry configured to
control a display to display a fixed image in a first area of the display and a medical image for diagnosis in a second area of the display, and
separately control a brightness of the fixed image displayed in the first area of the display and a brightness of the medical image displayed in the second area of the display, wherein
the control of the brightness of the fixed image displayed in the first area of the display is independent from the control of the brightness of the medical image displayed in the second area of the display.

2. The image display control apparatus according to claim 1, wherein
the fixed image where the brightness is reduced is displayed on the first area around the medical image for diagnosis.

3. The image display control apparatus according to claim 1, wherein the control circuitry is configured to invert the brightness of the fixed image displayed in the first area of the screen.

4. The image display control apparatus according to claim 1, wherein the control circuitry is configured to switch from a first mode for reducing the brightness of the fixed image displayed in the first area of the display to a second mode for inverting the brightness of the fixed image displayed in the first area of the display and reducing the brightness of the fixed image displayed in the first area of the display after the brightness of the fixed image is inverted.

5. The image display control apparatus according to claim 4, wherein
the control circuitry measures a first deterioration degree for a first part within an area that is represented at a relatively high brightness in the first mode and is represented at a relatively low brightness in the second mode, and a second deterioration degree for a second part within an area that is represented at a relatively low brightness in the first mode and is represented at a relatively high brightness in the second mode, and switches the first mode to the second mode base on the first deterioration degree and the second deterioration degree measured.

6. The image display control apparatus according to claim 5, wherein
the control circuitry calculates a difference between the first deterioration degree and the second deterioration degree, and enters a state where the first mode is capable of switching to the second mode when the difference exceeds a threshold value.

7. The image display control apparatus according to claim 5, wherein
the control circuitry measures the first deterioration degree and the second deterioration degree based on a deterioration factor that is higher as the brightness is higher.

8. The image display control apparatus according to claim 4, wherein
the control circuitry determines which mode of the first mode and the second mode is executed when the image display control apparatus is started to switch the first mode to the second mode.

9. The image display control apparatus according to claim 8, wherein
the control circuitry continues to execute the mode determined when the image display control apparatus is started until the next start.

10. The image display control apparatus according to claim 4, wherein
the control circuitry analyzes a whole image displayed on the screen to decide the first area of the fixed image where the brightness is inverted in the second mode.

11. The image display control apparatus according to claim 4, wherein
the control circuitry switches the first mode to the second mode on a plurality of displays such that respective modes executed on the plurality of the displays are the same mode.

12. The image display control apparatus according to claim 11, wherein
the control circuitry measures deterioration degrees in areas of a plurality of the displays, decides a display of the plurality of displays having the greatest deterioration degree based on the respective deterioration degrees measured, and switches modes of the other displays so as to match a mode switching of the display of the plurality of displays having the greatest deterioration degree.

13. The image display control apparatus according to claim 11, wherein
the control circuitry sets a level of reduction such that the levels of reducing the brightness in the respective modes executed on the plurality of the plurality of displays are the same.

14. The image display control apparatus according to claim 1, wherein the medical image is an X-ray image.

15. The image display control apparatus according to claim 1, wherein the control circuitry is configured to switch from a first mode for reducing the brightness of the fixed image displayed in the first area of the display to a second mode for inverting the brightness of the fixed image displayed in the first area of the display and reducing the brightness of the fixed image displayed in the first area of the display after the brightness of the fixed image is inverted.

16. The image display display control apparatus according to claim 15, comprising a plurality of the displays, wherein the control circuitry switches the first mode to the second mode on a plurality of screens such that respective modes executed on a plurality of the screens are the same mode.

17. A method of controlling brightness of a display, comprising:
   controlling a display to display a fixed image in a first area of the display and a medical image for diagnosis in a second area of the display; and
   separately controlling the brightness of the fixed image displayed in the first area of the display and the brightness of the medical image displayed in the second area of the display, wherein
   the controlling of the brightness of the fixed image displayed in the first area of the display is independent from the controlling of the brightness of the medical image displayed in the second area of the display.

18. A non-transitory computer-readable medium storing a program which when executed by a computer, causes the computer to perform a method of controlling brightness of a display, the method comprising:
   controlling a display to display a fixed image in a first area of the display and a medical image for diagnosis in a second area of the display; and
   separately controlling the brightness of the fixed image displayed in the first area of the display and the brightness of the medical image displayed in the second area of the display, wherein
   the controlling of the brightness of the fixed image displayed in the first area of the display is independent from the controlling of the brightness of the medical image displayed in the second area of the display.

19. An image display control apparatus, comprising:
   control circuitry configured to
      control a display to display a first image in a first area of the display and a second image for diagnosis in a second area of the display, and
      reduce a brightness of the first image displayed in the first area of the display without reducing a brightness of the second image displayed in the second area of the display.

20. The image display control apparatus according to claim 19, wherein the control circuitry is further configured to
   determine whether the first image is displayed in the first area of the display or not, and
   control the reduction of the brightness of the first image displayed in the first area of the display without reducing the brightness of the second image displayed in the second area of the display when the first image is determined to be displayed in the first area of the display.

* * * * *